United States Patent
Wang et al.

(10) Patent No.: US 10,635,633 B2
(45) Date of Patent: Apr. 28, 2020

(54) SYSTEMS AND METHODS FOR MEMORY ARCHITECTURE

(71) Applicant: SZ DJI TECHNOLOGY Co., LTD, Shenzhen (CN)

(72) Inventors: Ke Wang, Shenzhen (CN); Qiang Zhang, Shenzhen (CN); Wei Tuo, Shenzhen (CN); Taiwen Liang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 251 days.

(21) Appl. No.: 15/299,271

(22) Filed: Oct. 20, 2016

(65) Prior Publication Data

US 2017/0052963 A1    Feb. 23, 2017

Related U.S. Application Data

(63) Continuation of application No. PCT/CN2015/080532, filed on Jun. 1, 2015.

(51) Int. Cl.
*G06F 16/10* (2019.01)
*G06F 16/11* (2019.01)
*G06F 16/17* (2019.01)
*G06F 12/02* (2006.01)

(52) U.S. Cl.
CPC .......... *G06F 16/122* (2019.01); *G06F 12/023* (2013.01); *G06F 16/1727* (2019.01)

(58) Field of Classification Search
CPC ......... G06F 17/30082; G06F 17/30138; G06F 12/023; G06F 16/122; G06F 16/1727
See application file for complete search history.

(56) References Cited

U.S. PATENT DOCUMENTS

| 6,035,367 A | 3/2000 | Laws |
| 6,823,417 B2 | 11/2004 | Spencer |
| 7,062,602 B1 | 6/2006 | Moore et al. |
| 7,076,605 B1* | 7/2006 | Son .................... G06F 12/0804 711/113 |
| 7,103,772 B2 | 9/2006 | Jorgensen et al. |

(Continued)

FOREIGN PATENT DOCUMENTS

| CN | 1661568 A | 8/2005 |
| CN | 1878301 A | 12/2006 |

(Continued)

OTHER PUBLICATIONS

International search report and written opinion dated Mar. 8, 2016 for PCT/CN2015/080532.

*Primary Examiner* — Alford W Kindred
*Assistant Examiner* — Tiffany Thuy Bui
(74) *Attorney, Agent, or Firm* — Anova Law Group, PLLC

(57) ABSTRACT

The invention provides systems, methods, and devices related to writing and reading a file. A block area having a plurality of idle storage blocks is provided. Each idle block of said plurality of idle storage blocks is associated with a block identifier of a plurality of block identifiers. Additionally, each block identifier of the plurality of block identifiers is listed in a block index. Each block identifier has content that stores a unique block identifier of the plurality of block identifiers that links the block identifier with the unique block identifier, thereby linking the plurality of block identifiers.

17 Claims, 15 Drawing Sheets

(56) References Cited

U.S. PATENT DOCUMENTS

| | | |
|---|---|---|
| 7,330,956 B1 * | 2/2008 | McClure .............. G06F 9/5016 |
| | | 711/171 |
| 7,360,087 B2 | 4/2008 | Jorgensen et al. |
| 7,412,558 B2 | 8/2008 | Oribe et al. |
| 7,475,274 B2 | 1/2009 | Davidson |
| 7,546,951 B2 | 6/2009 | Kotlarsky et al. |
| 7,620,618 B2 | 11/2009 | Tsukamoto |
| 7,708,205 B2 | 5/2010 | Kotlarsky et al. |
| 7,779,426 B2 | 8/2010 | Rogers et al. |
| 7,840,730 B2 | 11/2010 | D'Amato et al. |
| 7,953,919 B2 | 5/2011 | Allen et al. |
| 7,979,264 B2 | 7/2011 | Khan et al. |
| 8,010,711 B2 | 8/2011 | Amron et al. |
| 8,023,751 B1 | 9/2011 | Reisman |
| 8,045,504 B2 | 10/2011 | Bedekar et al. |
| 8,086,794 B2 | 12/2011 | Fellinger et al. |
| 8,140,813 B2 | 3/2012 | Ozceri et al. |
| 8,166,210 B2 | 4/2012 | Aoyama |
| 8,266,283 B2 | 9/2012 | Liebman |
| 8,315,995 B1 * | 11/2012 | Levy .............. G06F 17/30132 |
| | | 707/694 |
| 8,316,288 B2 | 11/2012 | Nowoczynski et al. |
| 8,438,317 B2 | 5/2013 | Aoyama |
| 8,566,557 B2 | 10/2013 | Olsson et al. |
| 8,572,036 B2 | 10/2013 | Thomas et al. |
| 8,612,719 B2 | 12/2013 | Givargis et al. |
| 8,723,952 B1 | 5/2014 | Rozenboim |
| 8,751,604 B2 | 6/2014 | Liebman |
| 8,872,917 B1 | 10/2014 | Rozenboim |
| 2002/0023156 A1 * | 2/2002 | Chujo .............. G06F 17/30082 |
| | | 709/226 |
| 2004/0210418 A1 * | 10/2004 | Fukuda .............. G06F 11/3442 |
| | | 702/182 |
| 2008/0071723 A1 * | 3/2008 | Joshi .................. G06F 17/30067 |
| 2008/0183958 A1 * | 7/2008 | Cheriton ............. G06F 12/0223 |
| | | 711/108 |
| 2009/0249173 A1 | 10/2009 | Torigoe et al. |
| 2009/0265403 A1 * | 10/2009 | Fukumoto ........... G06F 12/0246 |
| 2010/0332846 A1 | 12/2010 | Bowden et al. |
| 2012/0330909 A1 * | 12/2012 | Bird .................. G06F 17/30516 |
| | | 707/693 |
| 2013/0269039 A1 * | 10/2013 | Gold ....................... G06F 21/64 |
| | | 726/27 |
| 2014/0223240 A1 * | 8/2014 | Patil .................... G06F 11/3034 |
| | | 714/47.1 |
| 2015/0131079 A1 * | 5/2015 | Heinonen ............... G01S 17/08 |
| | | 356/4.01 |

FOREIGN PATENT DOCUMENTS

| | | | |
|---|---|---|---|
| CN | 101529395 A | | 9/2009 |
| CN | 101699442 A | | 4/2010 |
| CN | 102024034 A | | 4/2011 |
| CN | 102768645 A | * | 11/2012 |
| CN | 102866954 A | | 1/2013 |
| CN | 102915340 A | | 2/2013 |
| CN | 102999442 A | | 3/2013 |
| CN | 103389945 A | | 11/2013 |
| CN | 103702057 A | | 4/2014 |
| CN | 101854388 B | | 6/2014 |
| JP | 2003030966 A | | 1/2003 |
| JP | 2007226596 A | | 9/2007 |
| JP | 2014199567 A | | 10/2014 |
| JP | 2015014963 A | | 1/2015 |

* cited by examiner

SYSTEMS AND METHODS FOR MEMORY ARCHITECTURE

CROSS-REFERENCE

This application is a continuation application of International Application No. PCT/CN2015/080532, filed on Jun. 1, 2015, the content of which is hereby incorporated by reference in its entirety.

BACKGROUND OF THE INVENTION

Conventional file systems are unable to accurately and efficiently capture large amounts of data in a short period of time. In particular, the capture of large amounts of data associated with files may result in errors when the storage ability of a memory architecture lacks the ability to match file uptake speed to the speed of acquiring content. This lacking may prevent image capture devices from utilizing their recording features to the fullest. For example, the lack of a sufficient storage structure may keep image capture devices, such as those associated with aerial vehicles such as unmanned aerial vehicles (UAVs), from maximizing the amount of information that they may record.

SUMMARY OF THE INVENTION

Systems and methods are provided for efficiently storing and reading files through the use of a linked structure of a storage system. Conventional file systems may require a large amount of overhead when storing large files as data from the files is stored within multiple disconnected storage areas. However, storage configuration methods and systems provided herein may be utilized to normalize a rate of uploading files by making the rate of storing data independent of file size.

Additionally, the files may be stored in a way that provides for fast retrieval. In particular, the files may be stored so as to eliminate a process of searching for the location(s) of the file when a read request is received. In contrast, conventional file systems generally require a processing step of searching for locations of stored files prior to the retrieval of the files. However, storage configuration methods and systems provided herein may be utilized to normalize a rate of reading files by making the retrieval of data independent of file size, as well.

An aspect of the invention may include a method of storing a file. The method may comprise receiving the file. The method may also comprise determining a plurality of idle storage blocks needed to store the file. Each idle storage block of the plurality of idle storage blocks corresponds to a block ID identifier unit. Additionally, each block ID identifier unit stores a block identifier of a next idle storage block, thereby forming a link relation between the plurality of idle storage blocks. Further, the file is stored in the plurality of idle storage blocks according to the link relation between the plurality of idle storage blocks.

Aspects of the invention may further include a method of reading a file. The method may comprise reading an index node. The index node stores a plurality of block identifiers associated with a plurality of storage blocks that store the file. Additionally, the method may comprise reading the plurality of storage blocks that store the file.

Additional aspects of the invention may include a method of linking idle storage blocks in a block area. The method may comprise providing a block area having a plurality of idle storage blocks. Each idle block of said plurality of idle storage blocks is associated with a block identifier of a plurality of block identifiers. Additionally, the method may comprise listing each block identifier of the plurality of block identifiers in a block index and associating each block identifier with a corresponding content. The corresponding content stores a unique block identifier of the plurality of block identifiers that links the block identifier with the unique block identifier, thereby linking the plurality of block identifiers.

Further aspects of the invention may include a method of increasing available storage in an image storage system. The method may comprise identifying a currently operable block identifier as a second block identifier that references a second idle storage block. The method may also comprise determining that an occupied storage block that is associated with a first block identifier has become idle. Additionally, the method may comprise updating the currently operable block identifier from the second block identifier to the first block identifier. The method may also comprise listing the first block identifier in a block index and associating the first block identifier with a first content that stores the second block identifier. A second location of the second idle storage block is independent of a location of the first idle storage block.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION OF THE INVENTION

Figure 1:
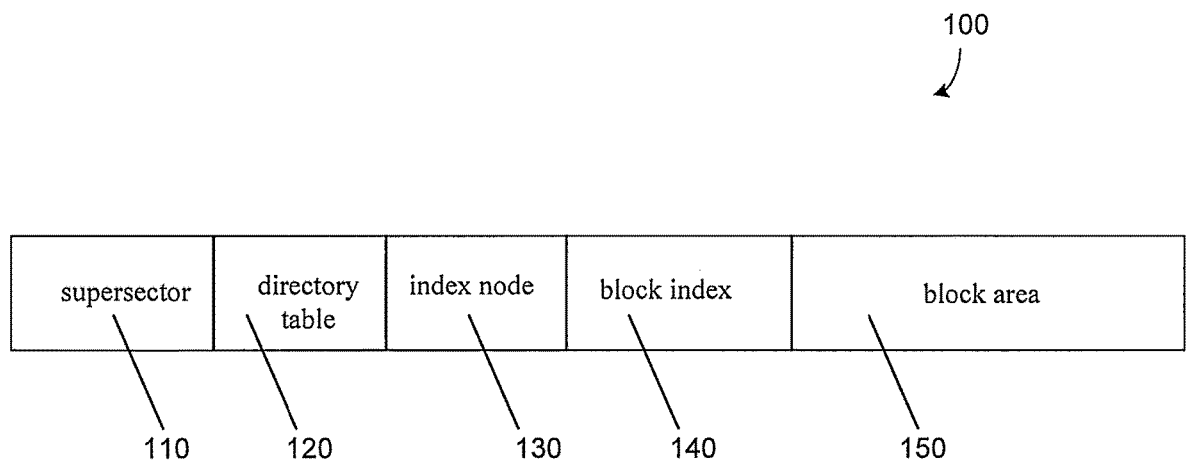
FIG. 1 illustrates an exemplary structure of a memory architecture system, in accordance with embodiments of the invention.

The invention provides systems, methods, and devices related to efficiently capturing, storing, and retrieving data. In particular, file structures are provided to upload and store large amounts of data so as to not impede a rate of acquiring the data. Additionally, file structures are provided to retrieve data without having an overhead cost associated with searching for the location(s) where the file data is stored. These systems and methods may be used to rapidly upload, store, and retrieve large amounts of data, such as image data. Additionally, the image data may be acquired by unmanned aerial vehicles (UAVs). In particular, the invention may relate to a file system configuration for an ultra-high speed camera. As such, the systems and methods provided herein may be applied to digital cameras or similar devices, such as those installed on a UAV. A UAV may be configured to capture image information using a media capture device coupled to the UAV.

Using the storage configuration methods and systems provided herein, a rate of uploading images may be normalized based on the structure of a filing system. This, in turn, may advantageously permit steady image capture. This is in contrast to other systems that may have a high internal overhead when reading or writing files, such as when reading or writing large files. In particular, previous systems of capturing video utilized configuration methods where the rate of writing a file was dependent upon the size of the file, the file system overhead, and the actual write overhead of the memory device. This relationship is represented as the equation:

$$\text{Rate} = (\text{size of the file})/((\text{file system overhead}) + (\text{actual write overhead}))$$

In accordance with the equation above, used for previous methods of configuring file systems for writing files, the write rate for files having different sizes would potentially differ due to the differing sizes of the files, even if the files were written by the same file system. In contrast, memory architecture systems provided herein provide a configuration for a media capture device file system which provides a rate of file writing that is independent of the size of the file that is being written. In particular, embodiments of the invention provide a file structure that links idle storage blocks in a way that can effectively make the size of a file independent to the rate of writing the file since each idle block is equally linked, and equally accessible, using the file writing structure. In this way, the rate of storing file components within idle storage blocks is independent of the location of the storage blocks. Additionally, embodiments of the invention also provide for storing a directory that references a file location rather than requiring a system to search for a file's location upon receiving a read request for the file. In this way, embodiments provided may decrease the overhead for file reading and writing. In particular, embodiments provided may be used to decrease the overhead for directory addressing, the overhead for file creating, and the overhead for address searching. Accordingly, using file system configurations of embodiments of the invention, the actual read-write rate of the memory device may be maximized, particularly when acquiring large amounts of data that would otherwise be burdensome on conventional file writing systems.

The memory architecture system as provided herein may be used to store any type of file. The file may include images, video, documents, reports, audio files, or other examples. Additionally, the file may be a large file. The file size may be 30M for a 6 K image. The file size may be 60M for an 8 K image. As provided in examples discussed herein, the files to be stored may be obtained from a media capture device, such as a camera. Files stored in a camera are normally images. In an example of an image having 4 K and 10 bit, a raw image may need a memory bandwidth of 10.5M. If the frame rate is 60 frames per second and the image is not compressed, then a total 640M of data may be stored in hard disk every second during a period of image acquisition. However, using conventional systems, a transmission rate of a media capture device may have a utilization rate that is between 30% to 40%. In order to take advantage of this overlooked resource, embodiments provided herein disclose a file system configuration for cameras or the like which can decrease the internal overhead of the file system and increase a utilization of bandwidth of the memory device.

Systems and methods provided herein disclose a disk storage structure of a memory architecture structure, or "file system." In particular, a file system configuration that can decrease the internal overhead of the file system and increase a utilization of bandwidth of a memory device is provided. This file configuration is particularly advantageous when applied to image capture devices, such as high-speed image capture devices. Obtaining images at a high rate generally takes up a large amount of bandwidth. By decreasing an internal overhead of a file system during image acquisition, the amount of bandwidth that is devoted to obtaining the images themselves may be increased. This, in turn, may increase the reliability of the image acquisition. As such, embodiments of the disk storage structure discussed herein may be advantageously applied to the acquisition of image files, media files, multimedia files, and other forms of content that are associated with rapid acquisition of data.

The file system structure of embodiments described herein is provided in FIG. 1. In particular, FIG. 1 provides an exemplary structure 100 of a memory architecture system, in accordance with embodiments of the invention. FIG. 1 includes a supersector 110, directory tables 120, index node tables 130, block index 140, and block area 150.

Information that is associated with the file system may be recorded in a supersector 110. Supersector 110 is a key information area. Disk information and information that is used in system booting may be recorded in the supersector 110. In particular, disk information and information that is used in system booting may include information that is associated with running the memory architecture system itself. Information stored within a block storage area may not be included in the disk information and information that is used in system booting, as the information stored in the block storage area may be related to images or other data that is stored within the system, and may not interact with the information that is used in running the system itself. An example of a structure of a supersector 110 is provided below in FIG. 2. Additionally, information that is related to a directory may be recorded in a directory table 120. In particular, information that is related to a directory may include directory item information. An example of a directory table is provided below in FIG. 3, and an example of a directory item structure is provided below in FIG. 4.

Additionally, information that is related to the file itself may be recorded in an index node table 130. An example of an index node table is provided below in FIG. 5, and an example of a data structure of an index node is provided below in FIG. 6. Further, information that is related to storage blocks may be recorded in a block index 140. An exemplary data structure of a block index is provided below in FIG. 7. Information that is related to storage blocks and stored in the block index may be linked with each other. Additionally, a file component of a file, such as an image file, may be stored in a block area 150, where a block area may be a data storage area.

Figure 2:
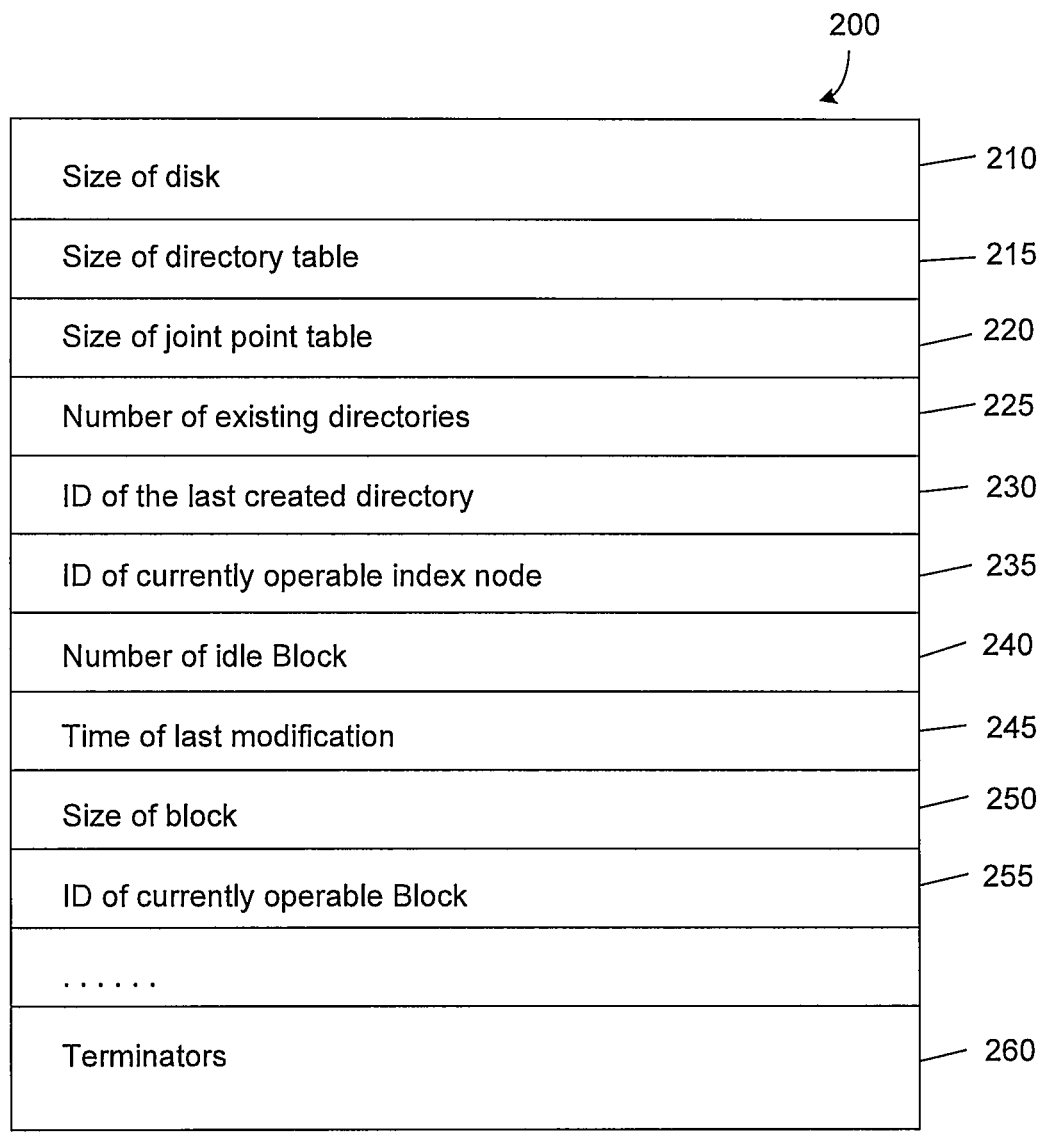
FIG. 2 illustrates an exemplary supersector structure of a memory architecture system, in accordance with embodiments of the invention.

FIG. 2 illustrates an exemplary supersector structure 200 of a memory architecture structure, or "file system," in accordance with embodiments of the invention. Information that is associated with the file system may be stored in the supersector, which is a key information area. The supersector structure 200 includes a size of disk 210. The size of disk 210 may refer to the amount of storage that is locally available on the disk, the amount of storage that is available for storing third-party data, the amount of storage that is accessible by a file system across multiple memory devices, or other examples. Additionally, a size of directory table 215 and a size of join point table 220 may be included in supersector structure 200. A join point table 220 may refer to a database table that contains common fields from two or more tables within the same database. Additionally, a number of existing directories 225 and an identifier of a last created directory 230 may be included in supersector structure 200. The number of existing directories 225 and a last created directory 230 may be used to determine availability for new directories and to determine a reference number to assign new directories, respectively. Supersector structure 200 may also include an identifier of a currently operable index node 235, a number of idle blocks 240, a time of last modification 245, a size of block 250, an identifier of a currently operable block 255, and/or terminators 260. An identifier of a currently operable index node 235 is able to indicate a location to store data associated with an image file. In particular, an index node may be used to store a description of the file. Currently operable index node identifier 235 may point to the first index node in an index node table that is idle. Additionally, a number of idle blocks 240 is determined based on the size of the disk 210 and the size of a block 250. Further, an identifier of a currently operable block 255 is able to indicate a location to store a file component of a file. In particular, currently operable block identifier 255 may point to the first block identifier that corresponds to an idle storage block in the block area. Additionally, terminators may be used for a preliminary detection on whether a file system exists.

Figure 3:
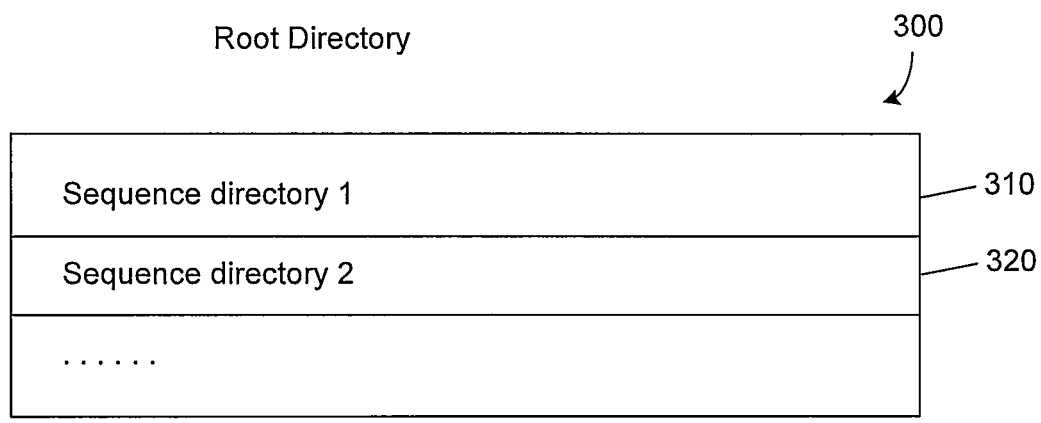
FIG. 3 illustrates an exemplary directory table structure of a memory architecture system, in accordance with embodiments of the invention.

FIG. 3 illustrates an exemplary directory table 300. In particular, directory information may be recorded in root directory table 300. In examples, the file system may have two directory tables: a root directory 300 and a sequence file directory 310, 320. The directory level may be used to distinguish sequence files. In an example, a directory may be used to store a set of files, such as photo album. Under this example, a sequence file directory 310 may be used to store photographs associated with a trip to Hawaii. Each photograph, or image file, may have information relating to the photograph stored in an index node file. Each of the index node files may, in turn, be referenced by the sequence file directory 310. Additionally, the number of sequence file directories referenced by a root directory 300 may be predictable.

Figure 4:
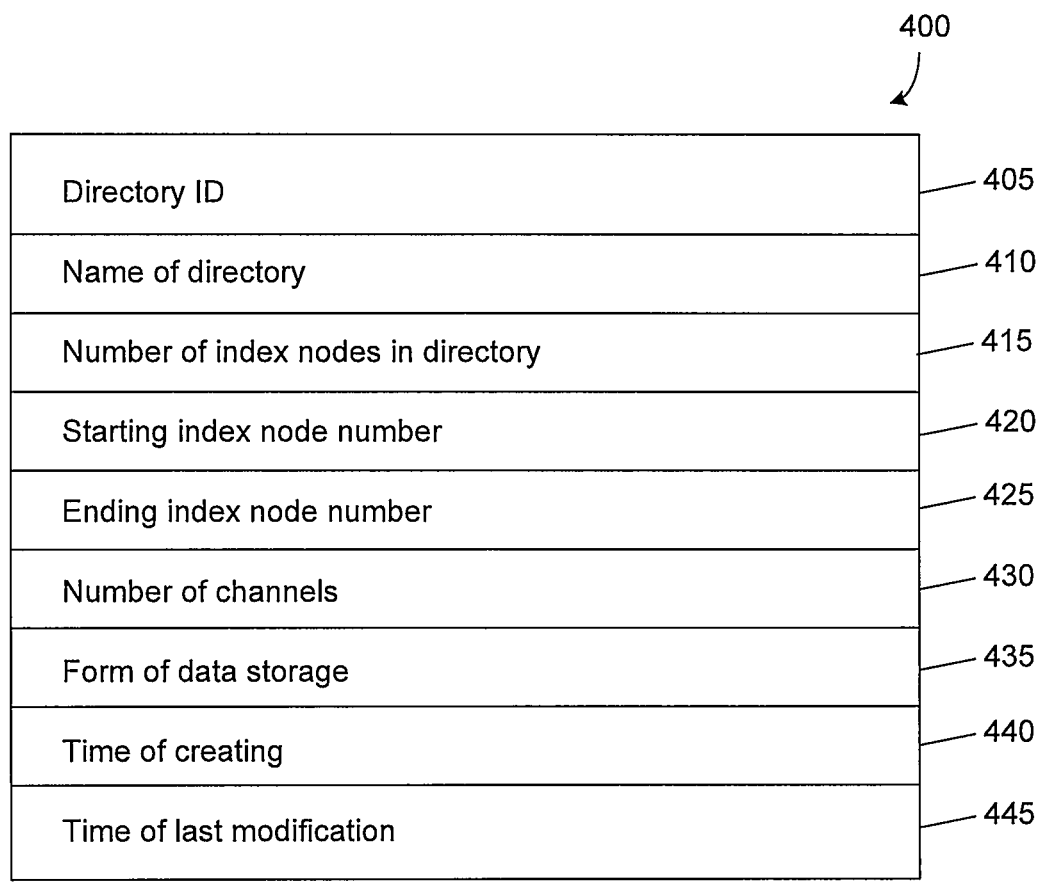
FIG. 4 illustrates an exemplary directory item structure of a memory architecture system, in accordance with embodiments of the invention.

Further, a directory table 120 may have directory items. Each directory item may have a particular data structure. Accordingly, FIG. 4 illustrates an exemplary data structure of a directory item 400. In particular, a directory item 400 as illustrated in FIG. 4 includes a directory identifier 405, a name of directory 410, a number of index nodes in a directory 415, a starting index node number 420, an ending index node number 425, a number of channels 430, a form of data storage 435, a time of creating 440, and/or a time of last modification 445. Using an example of an album of photographs that were taken during a trip, a starting index node number 420 may be associated with a first photograph in the album and an ending index node number 425 may be associated with a last photograph in the album. Additionally, the number of index nodes in the directory 415 may be associated with the total number of photographs in the album.

Figure 5:
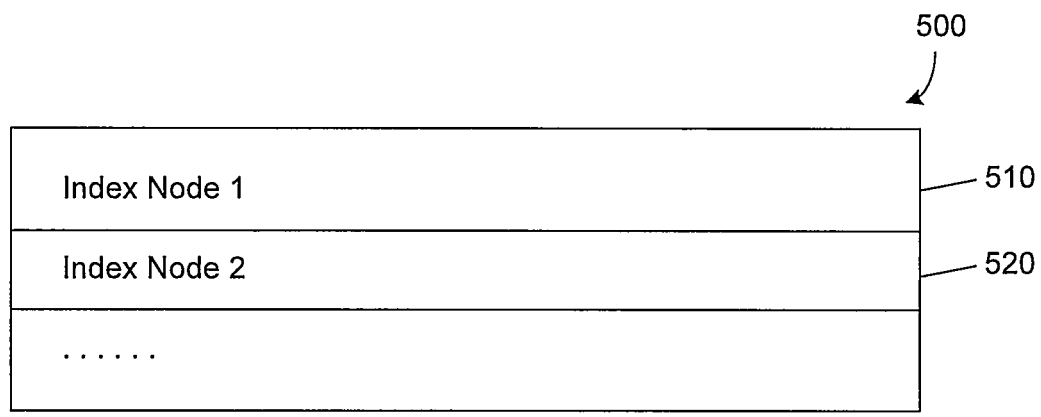
FIG. 5 illustrates an exemplary index node table structure of a memory architecture system, in accordance with embodiments of the invention.
Figure 6:
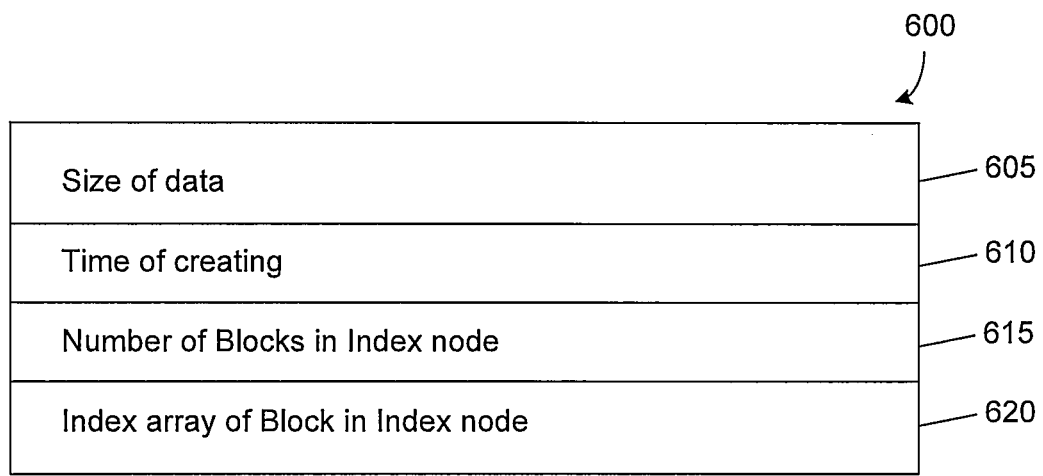
FIG. 6 illustrates an exemplary data structure of an index node, in accordance with embodiments of the invention.

As seen in FIG. 5, an exemplary index node table 500 structure of a memory architecture system is provided, in accordance with embodiments of the invention. Index node table 500 comprises two index nodes 510, 520. Each index node may be associated with a file. Further, each index node may be used to store a location(s) of file components of a stored file. Additionally, FIG. 6 illustrates an exemplary data structure of an index node 600, in accordance with embodiments of the invention. In particular, FIG. 6 includes a size of data 605. The size of data 605 may comprise an array of four elements. Additionally, FIG. 6 may include a time of creating 610, a number of blocks in an index node 615, and/or an index array of blocks in an index node 620. In this way, when a read file is received to read a file, the index node that is storing information related to the file may be identified, and the location of the file components that are associated with the file may be identified based on the information that is stored in the index node.

Figure 7:
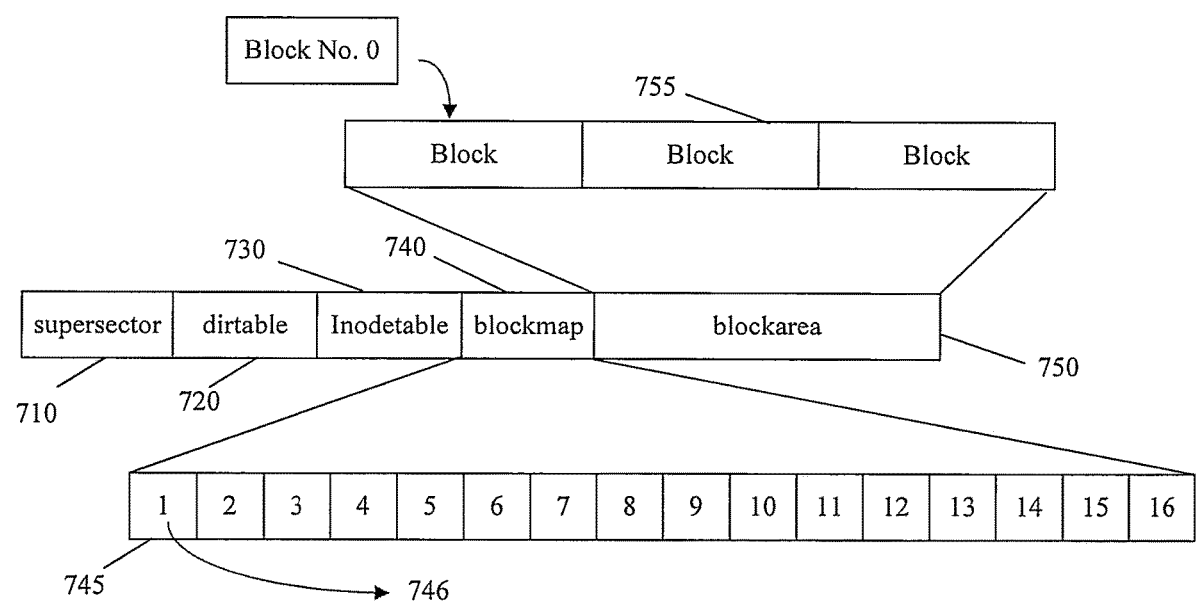
FIG. 7 illustrates an exemplary structure of a block index, in accordance with embodiments of the invention.

An exemplary structure 700 having a block index 740 is provided in FIG. 7. In particular, FIG. 7 illustrates a structure 700 having a block index 740 that corresponds to blocks within a block area 750. Data structure 700, which may be a memory architecture structure, also includes a key information area 710, data tables 720, and index node tables. 730. As seen in FIG. 7, a block index 740 may be considered as a large array of block ID identifier units, such as block ID identifier unit 745. The size of the array, or block index 740, may be equal to a number of storage blocks 755 in a block area 750. In particular, each block ID identifier unit within the block index 740 may correspond to a storage block in the block area 750.

Additionally, each block ID identifier unit in a block index may record at least one kind of information: whether its corresponding storage block is occupied, and which storage block is the next idle block that is linked to this block if the block is idle. In particular, each block ID identifier unit may record either (1) the block identifier for the next idle storage block, or (2) an indicator that the storage block that corresponds to the block ID identifier unit is occupied. An example of (1) is seen illustrated in FIG. 7, where block ID identifier unit 745 has a content 746. In particular, content 746 is a number "1" which identifiers a next block identifier. Additionally, each unit within the block index is linked to another unit, forming a connected structure within the block index. This incrementally linked structure may allow for rapid storing of data during image acquisition. Additionally, the linked structure may be reproducible when an image is no longer needed such that blocks previously used for storage may be reintegrated into the linked structure. In particular, when a formerly occupied storage block becomes idle, a block identifier that corresponds to the newly idle storage block may replace the currently idle storage block identifier and may place the reference to that block identifier within its content.

In examples, a block ID identifier unit that corresponds to a storage block that is occupied may present an indicator that the storage block is occupied. In examples, the indicator may be a representation such as "0xFFFFFFFF" to illustrate that the storage block is occupied. The indicator may be another form of representation, such as "occupied" or another phrase that is associated with an occupied storage block. When a storage block is idle, however, the block ID identifier unit may present a numerical value. In particular, the block ID identifier unit may present a block identifier that corresponds to another block identifier that is linked to the block ID identifier unit.

In examples of a block index structure, two levels of mapping structures may be provided. In particular, the first level of mapping may be a mapping from the directory table to the join point table. Additionally, the second level of mapping may be a mapping from the join point table to the storage block table. The storage block table may be a concept table. Additionally, various embodiments related to block index storage and sequence storage may be proposed in embodiments discussed herein. In particular, the idle blocks on a memory device may be linked through the use of a block index. Additionally, information that is associated with the occupied blocks may be recorded.

Further, as discussed further below, a structure that allows for incremental storage may be used such that the object to be stored is a potential directory for accessing an image recorded from a high speed camera rather than the image itself. In particular, the object stored may be a quick reference for how to locate and read a previously stored image. This structure of storage greatly decreases the amount of time and bandwidth required for searching for a stored image file, particularly when the stored image file is stored across a number of storage blocks that may not be in close proximity. In this way, embodiments discussed herein provide a structure that minimizes overhead when writing a file and also minimizes effort required to locate and read a file that has already been stored.

An example of linking idle storage blocks together for storing a file may be initiated before a file is received. In particular, a block area having a plurality of idle storage blocks may be provided. Each idle storage block of said plurality of idle storage blocks may correspond to a block identifier of a plurality of block identifiers. Additionally, each block identifier of the plurality of block identifiers in a block index may be listed as a block ID identifier unit and may have a corresponding content. The corresponding content may store a unique block identifier of the plurality of block identifiers that links the block identifier with the unique block identifier. In this way, the plurality of block identifiers may be linked.

In additional examples, a first block identifier of the plurality of block identifiers may be listed as a currently operable block identifier. Additionally, the currently operable block identifier may reference a currently idle storage block. In further examples, the block identifier that is listed as a current block identifier may not be stored in the content of another block identifier.

Figure 8:
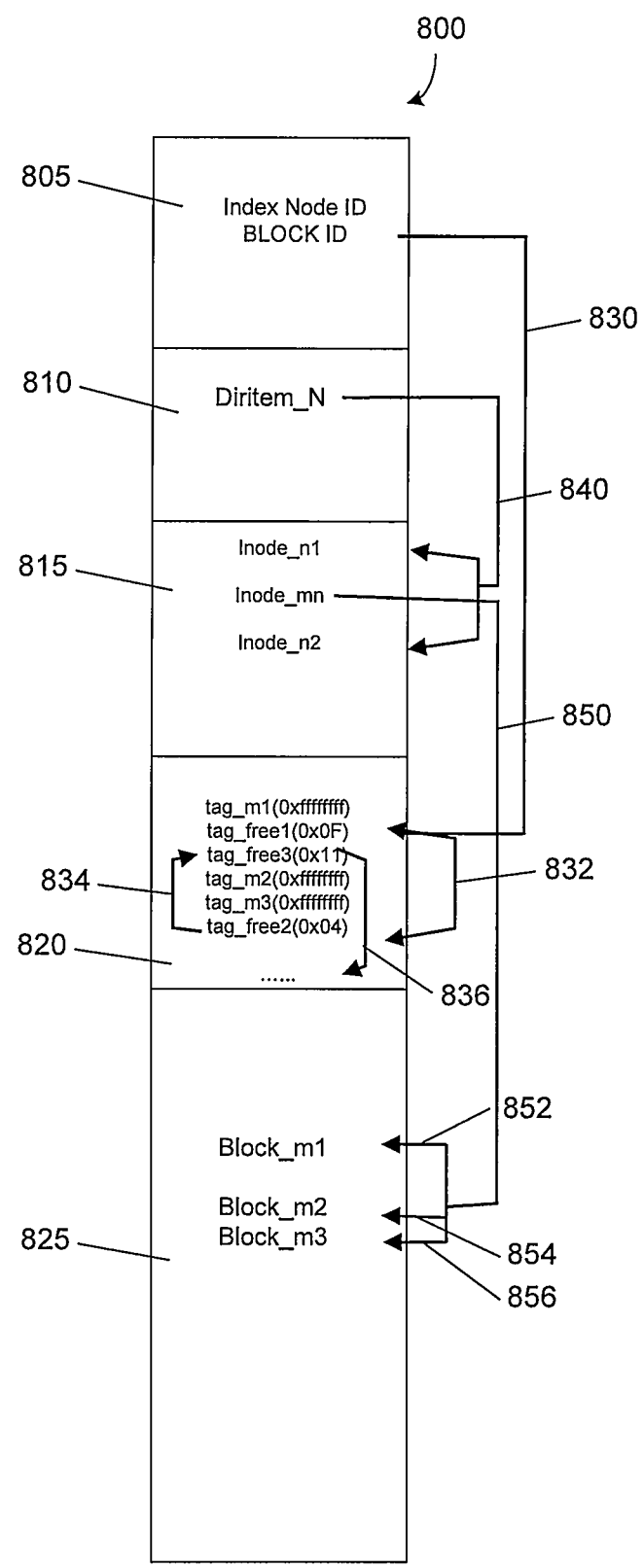
FIG. 8 illustrates a schematic of exemplary interactions between components of a memory architecture system, in accordance with embodiments of the invention.

Components of the memory architecture system may have multiple forms of interaction. FIG. 8 illustrates a schematic of exemplary interactions between components of a memory architecture system 800, in accordance with embodiments of the invention. In particular, FIG. 8 provides supersector component 805, directory component 810, index node component 815, block index component 820, and block area component 825 within the memory architecture system 800.

Supersector component 805 may be a key information area. As such, supersector component 805 may include information relating the other components of the memory architecture system 800. In particular, supersector component 805 may include an identifier of a currently operable index node, referenced as "Index Node ID," and an identifier of a currently operable block, referenced as "BLOCK ID." The latter relationship is illustrated in FIG. 8, which provides a connector 830 from supersector component 805 to block index 820. In particular, connector 830 provides a currently operable block identifier from block index 820 to supersector component 805. In particular, the currently operable block identifier as provided to supersector component 805 is "tag_free 1(OxOF)."

FIG. 8 also illustrates a number of connections within block index 820. In particular, the currently operable block as illustrated in FIG. 8 is "tag_free 1(OxOF)", where "tag_free 1(OxOF)" is a block ID identifier unit and the list of block ID identifier units as provided in block index 820 may also be referred to as a block index. Moving along the links between block ID identifier units, "tag_free 1(OxOF)" is connected to a next operable block "tag_free 2(OxO4)" via connection 832. The next operable block "tag_free 2(OxO4)" is then connected to a subsequent operable block "tag_free 3(Ox11)" via connection 834, which is then further connected to an operable block in a space further down the block index 820 via connection 836. Accordingly, the block index 820 of FIG. 8 illustrates the linkages between block ID identifier units.

Additionally, FIG. 8 illustrates connections between directory component 810 and index node component 815. In particular, a directory item of directory component 810 may reference index node items "Inode_n1", "Inode_mn", and "Inode_n2" via connection 840. Further, "Inode_mn" may be further connected to blocks in block area 825. In particular, "Inode_mn" may be connected to blocks "Block_m1", "Block_m2", and "Block_m3" within block area 825 via connection 850. As such, once a directory item of directory component 810 is identified, a related index node item may be identified in index node component 815, which may further include stored information related to the location of file components that are stored in blocks at block area 825.

FIG. 8 also illustrates the ability to free up block area space by removing one or more connections between blocks in block area 825 and index node 815. In particular, index node component 815 is generally connected to block area 825 via connection 850, and is specifically connected to blocks "Block_m1", "Block_m2", and "Block_m3" within block area 825 via connections 852, 854, and 856, respectively. The connections 852, 854, and 856 indicate that blocks "Block_m1", "Block_m2", and "Block_m3" are occupied. However, if one or more of the connections are cut, then the respective block may be considered idle again.

In some examples, an idle block may comprise a block that is not currently storing a file component. In other examples, an idle block may comprise a block that is not connected to a file retrieval reference. In the second example, the block may stay idle, but may continue to store a portion of a previous image file until the block is assigned a new file component to store. When there is a new file component to store, the block may store that new file component by writing over the previous file component. In this way, the block area may avoid expending the processing power to delete every image file component that is no longer associated with a desired image file, and may instead focus processing resources on allocating storage to incoming files.

Before a file to be stored is even received, structural components of the memory architecture structure may be established. In particular, when the file system is booting up, a processor may read information associated with each file structure component of the memory architecture structure, except from the block area, to memory. Further, the system may populate information within the file structure where the information is available. For example, the system may populate an identifier of the last created directory, such as identifier 225 in supersector structure 200; the identifier of the currently operable index node, such as identifier 230 in supersector structure 200; and the identifier of the currently operable block, such as identifier 250 in supersector structure 200, among other information.

Additionally, when the file system is initialized, an image capture device that is communicatively connected with the file system may enter a capturing mode. In examples, the file system may be stored within the image capture device such that the file system is initiated in response to engaging the image capture device. When the image capture device has initiated a capturing mode, a new directory may be created in the file system. In particular, the new directory may be generated using an unique directory identifier. Additionally, the directory identifier may be based on, and incrementally increased from the identifier of the last created directory, as provided by identifier 225 of supersector structure 200.

If a new image is received that is to be stored, a number of characteristics of the new image may be determined prior to writing the image to a file to be stored in the file system. In particular, a determination may be made as to how many blocks of a block area within the file system are to be occupied by the image. The number of blocks in the block area that are required to store the image may be calculated based on a size of the image. For example, the number of blocks in the block area that are required to store the image may be determined by taking the overall size of the image and dividing the overall size of the image by the size of an individual block. The resulting number will be indicative of the number of storage blocks that are needed to store the image. Further, if the resulting number is a non-integer (for example, if the resulting number is 2.5), then the number of storage blocks needed to store the image will be the next consecutive integer that is successive from the resulting number. In an example where the overall size of the image divided by the size of a storage block results in a number 2.5, the number of storage blocks that are needed to store the image will be the next successive integer, which is 3.

The information on the number of occupied blocks to be updated may be populated in the file structure based on the calculated number of blocks. In particular, once the number of storage blocks that are needed to store the image are determined, the "number of blocks in index node" content 615 may be updated in the index node data structure 600.

Additionally, the image data may be stored in a designated block in a block area based on the content of the "currently operable block" identifier 250 of the supersector structure 200. If a plurality of blocks is needed to store the image, an initial block will be stored in the designated block in the block area based on the content of the "currently operable block" identifier 250, after which the "currently operable block" will be updated to the next currently operable block based on content within the block index 140. After the initial block is stored, the "currently operable block" identifier 250 is updated to reflect the next block to be indexed based on a link within block index 140. Additionally, each time a block is stored, the value of the corresponding position in the block index may be assigned to a variant which stores an identifier of the currently operable block. Then, the corresponding position in the block index may be written as containing an indicator that the block is occupied. This process is repeated for any remaining image file components that need to be stored, such that each image file component that is stored within the file system is stored to a block that is referenced as a "currently operable block" 250 in the supersector structure 200.

After the storing process, the identifier of the currently operable index node 230 of supersector structure 200 may be updated. In examples where the index node table 130 is a consecutive table, the ID of the currently operable index node 230 may be increased incrementally. In examples, the ID of the currently operable index node may be increased by a single integer when it is updated.

An example of a write process that is used to store a file may be initiated when a file is received. Once the file is received, a plurality of idle storage blocks that are needed to store the file may be determined. The number of idle storage blocks needed to store the file may be calculated based on an amount of data within the file. In particular, the amount of data within the file may be determined based on the size of the file.

Additionally, a currently operable index node identifier may be determined after receiving the file. In examples, the currently operable index node may be determined by adding a successive increment to a most recent occupied index node identifier. In examples, the successive increment may be a single integer. Additionally, information about the image file may be stored within the index node. For example, the number of held blocks as stored within a currently operable index node may be updated to reflect the number of blocks that are used to store the image file. In particular, the number of held blocks may include reference to the number of blocks used to store the file.

Each idle storage block of the plurality of idle storage blocks may correspond to a block identifier of a plurality of block identifiers. Each block identifier has content that stores a unique block identifier of the plurality of block identifiers that link the block identifier with the unique block identifier, thereby forming a link relation between the plurality of idle storage blocks. Additionally, the file may be stored in the plurality of idle storage blocks according to the link relation between the plurality of idle storage blocks.

In particular, when the file is stored, a currently operable block identifier may be referenced and an image file component of the file may be stored in storage block that is identified by the currently operable block identifier as being the currently idle storage block. The currently operable block identifier may be determined based on a last occupied block identifier and a block identifier which is linked by the occupied block identifier in the block index.

Each time a block is stored, a value in the block index may be updated. Additionally, a currently operable block identifier as stored in a supersector may be updated when a block is stored. In particular, the supersector may be a table in an information sector that is used to describe a disk system structure.

After storing the file, the currently operable block identifier is updated after all data from the file is stored. Additionally, the currently operable index node identifier may be updated so as to reflect the next available index node identifier. In particular, the next available index node identifier may be determined by adding a successive increment to the previous currently operable index node identifier.

In other examples, the write process may begin by initializing a file system before receiving the file. In particular, initializing the file system may comprise determining and recording a currently operable index node identifier. Additionally, the initializing the file system may comprise determining and recording a currently operable idle block. Additionally, a table for describing disk system structure may be written from memory to a hard disk. In examples, the table can be written to the hard disk every one second.

In further examples, the image capture device that is used may be installed on a movable object. The movable object may be an unmanned aerial vehicle. Additionally, the step of capturing the file may occur while the UAV is in flight. In examples, the file may be a media file, an image file, or a video file.

An advantage of the embodiments disclosed herein is the efficient read process that may be utilized based on the optimized file structure for storing images. In particular, files that are retrieved using the current system require no overhead to determine the location of image file components. Instead, current embodiments are directed towards storing a directory that provides each location of a stored image component. In this way, when an image file is retrieved, there is no overhead that is needed to search for the location of the image file components. This is advantageous over previously designed file structure systems where the overhead associated with retrieving files can be quite large, especially with respect to image files or multimedia files. Since the current embodiments have no overhead associated with determining the location of image file components when the image file is read, portions of the read process associated with determining the locations of image file components are independent of a file size.

When the file system is booting up, structural components of the memory architecture structure may be established. In particular, when the file system is booting up, a processor may read information associated with each file structure component of the memory architecture structure, except from the block area, to memory. Further, the system may populate information within the file structure where the information is available. For example, the system may populate an identifier of the last created directory, such as identifier 225 in supersector structure 200; the identifier of the currently operable index node, such as identifier 230 in supersector structure 200; and the identifier of the currently operable block, such as identifier 250 in supersector structure 200, among other information.

Once the system is initialized, a command for reading an image may be issued by hardware. Additionally, a string of the command may be analyzed by software to determine a location of the image to be read. In embodiments of the invention, however, the location of the image file components may include a directory. As such, when a directory of the location of the image is included in a string of the command, the software doesn't need to do further work to look-up the location of the image. Instead, the software simply needs to open the directory and find the location of the image. The software may have access to a number associated with the image so as to allow the software to determine a directory item that is associated with the image. Accordingly, the software may search the directory table according to the name of the directory. Additionally, the corresponding directory item may be found based on the search. Further, the identifier for storing the image may be indexed according to the starting index node number and the ending index node number in the directory item.

In this way, the location of the image may be found by analyzing the index node associate with starting index node number and an ending index node number. Additionally, the number of blocks in the index node and the index identifier of each block may be read. Based on this information, the read data from the block area may be read according to the block index.

An example of a read process that is used to access a file may be initiated when a read request is received. Once the read request is received, an index node that is associated with the read request may be read. The index node may store a plurality of block identifiers that correspond to a plurality of storage blocks that store the file. Additionally, the plurality of storage blocks that store the file may be read. In particular, the plurality of storage blocks may be accessed using the block identifiers that are stored in the index node.

In further examples, a first block identifier of the plurality of block identifiers may be listed as a currently operable block identifier. Additionally, the currently operable block identifier may reference a currently idle storage block, such as a currently idle storage block that corresponds to the first block identifier. The block identifier that is listed as currently operable block identifier may not be stored in the content of another block identifier. In particular, block identifiers may have content that directs to a block identifier that is next available to store file content. If a block identifier is the currently operable block identifier, therefore, there is not a block identifier that has content matching the currently operable block identifier. Additionally, once the idle storage block that corresponds to the currently operable block identifier stores a file component, the storage block is no longer idle and the currently operable block identifier is updated. In particular, the currently operable block identifier is updated from the first block identifier to a second block identifier that is listed in the block index.

Figure 9:
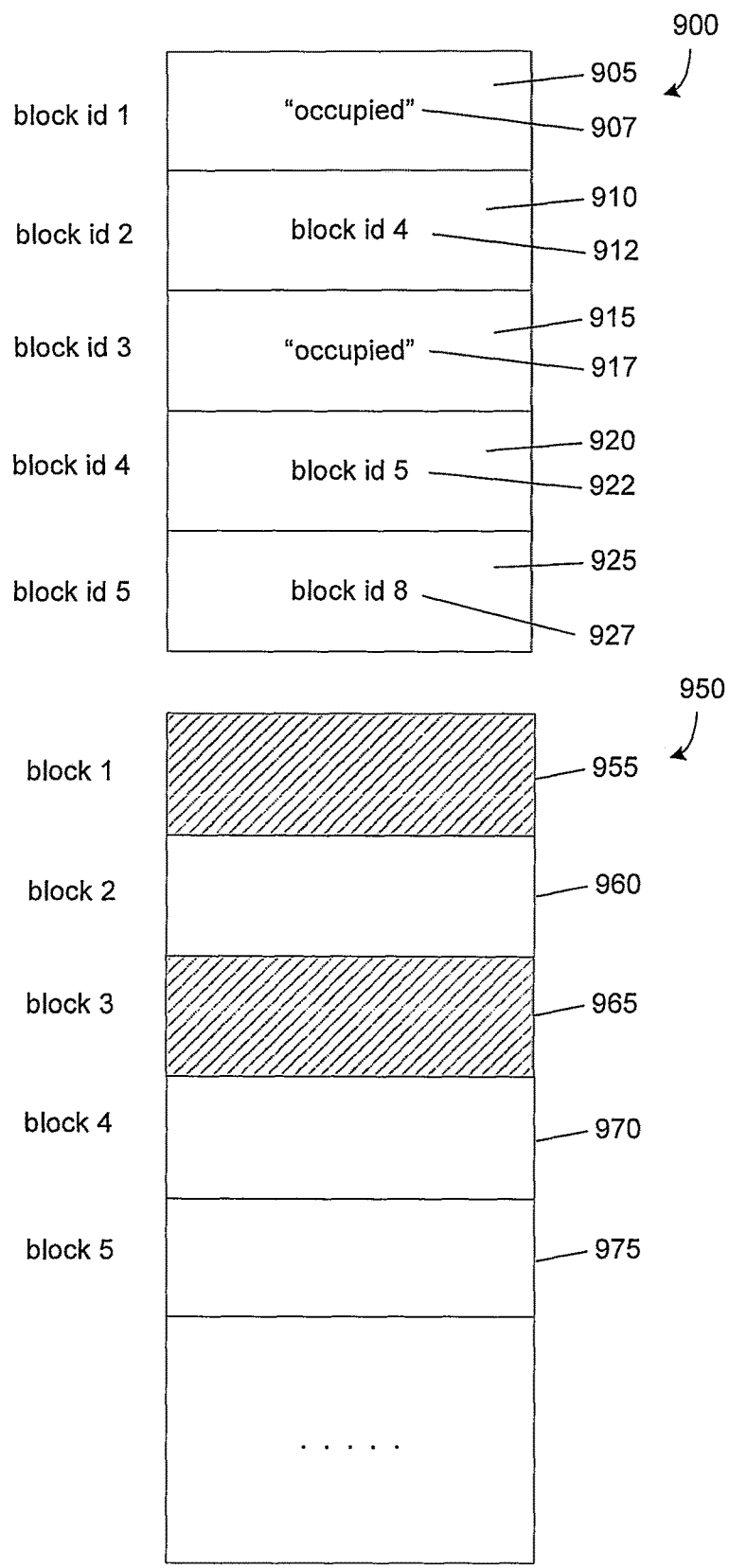
FIG. 9 illustrates relationships between a block index and a block storage area, in accordance with embodiments of the invention.

The relationships between the components for linking idle storage blocks in the block storage area is illustrated in FIG. 9. In particular, FIG. 9 illustrates relationships between a block index 900 and a block storage area 950, in accordance with embodiments of the invention. In particular, FIG. 9 illustrates block index 900 having block ID identifier units 905, 910, 915, 920, and 925. Each block ID identifier unit 905, 910, 915, 920, and 925 corresponds to a storage block 955, 960, 965, 970, 975 at storage block area 950, respectively. Additionally, each block ID identifier unit 905, 910, 915, 920, and 925 stores content 907, 912, 917, 922, and 927, respectively.

When a block ID identifier unit, such as block ID identifier unit 915, has content 917 that is labeled "occupied," the storage block within block storage area 950 that corresponds to block ID identifier unit 915 is occupied. As seen in FIG. 9, storage block 965 corresponds to block ID identifier unit 915. Since the content 917 of block ID identifier unit 915 is "occupied," the corresponding storage block 965 is shaded as being occupied as well. Once storage blocks are occupied, a reference to each occupied storage block is stored within an index node that stores location information of the associated file. For example, if occupied storage blocks "block 1" and "block 3" stored file components associated with the same file, then a reference to each of the storage blocks would be stored within a shared index node, or "Inode."

Since an index node stores references to the locations of the storage blocks used to store file components of a file, there may be no search required when a read request is received to retrieve the file. Rather, when a read request is received for a particular file, the associated index node may be determined and the locations of the storage blocks that store components of the file are read. In this way, the rate of retrieving a file is independent of the size of the file, as a reference to each location associated with the file is provided within an index node that stores information associated with the file.

Additionally, when a block ID identifier unit, such as block identifier 910, has content that references another block identifier, the storage block within block storage area 950 that corresponds to block identifier 912 is the next storage block to be occupied once the storage block that corresponds to block ID identifier unit 910 is occupied. As seen in FIG. 9, once the storage block that corresponds to block ID identifier unit 910, referenced as "block id 2", is occupied, the next subsequent storage block to be occupied by a file component will be block identifier 912, referenced as "block id 4." In this way, the block identifiers are linked. In particular, as seen in FIG. 9, block ID identifier unit 910, referenced as "block id 2" is linked to block ID identifier unit 920, referenced as "block id 4," which in turn is linked to block ID identifier unit 925, referenced as "block id 5."

Figure 10:
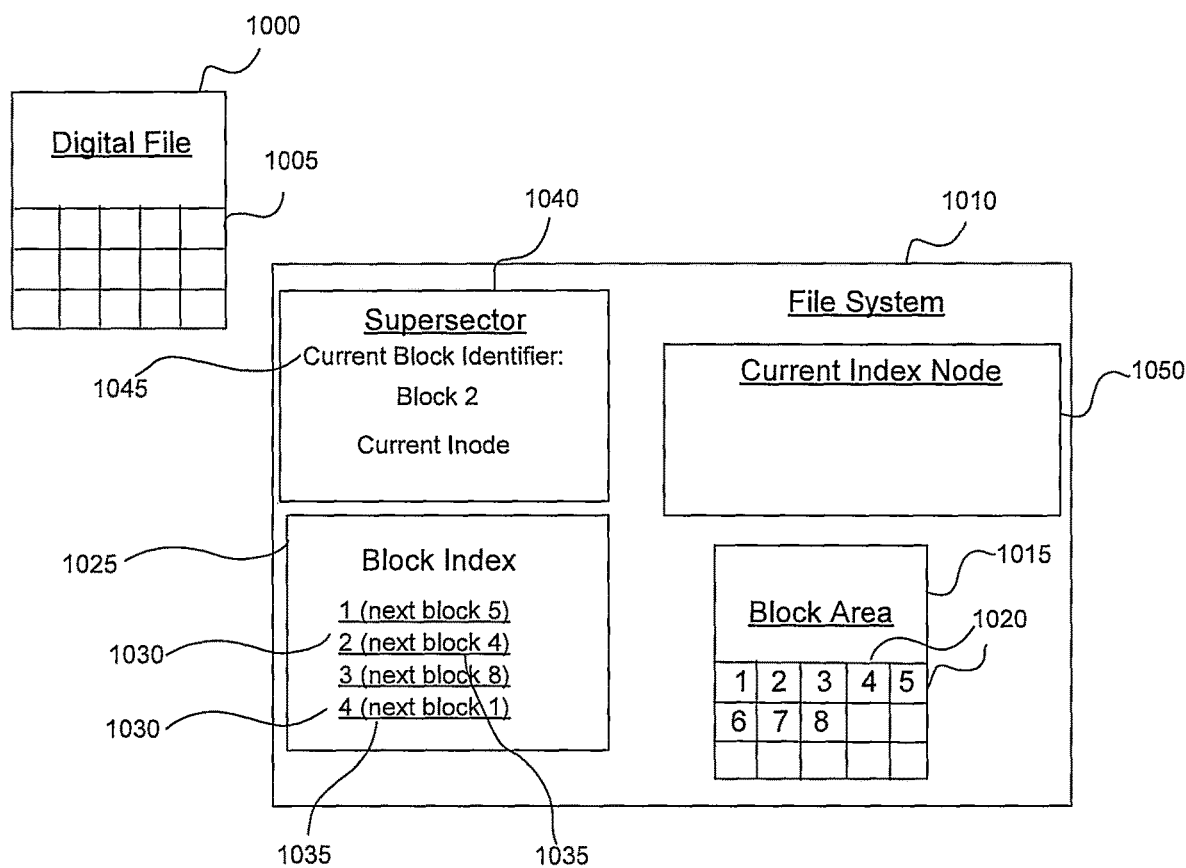
FIG. 10 illustrates an exemplary schematic for file storage of a memory architecture system, in accordance with embodiments of the invention.
Figure 11:
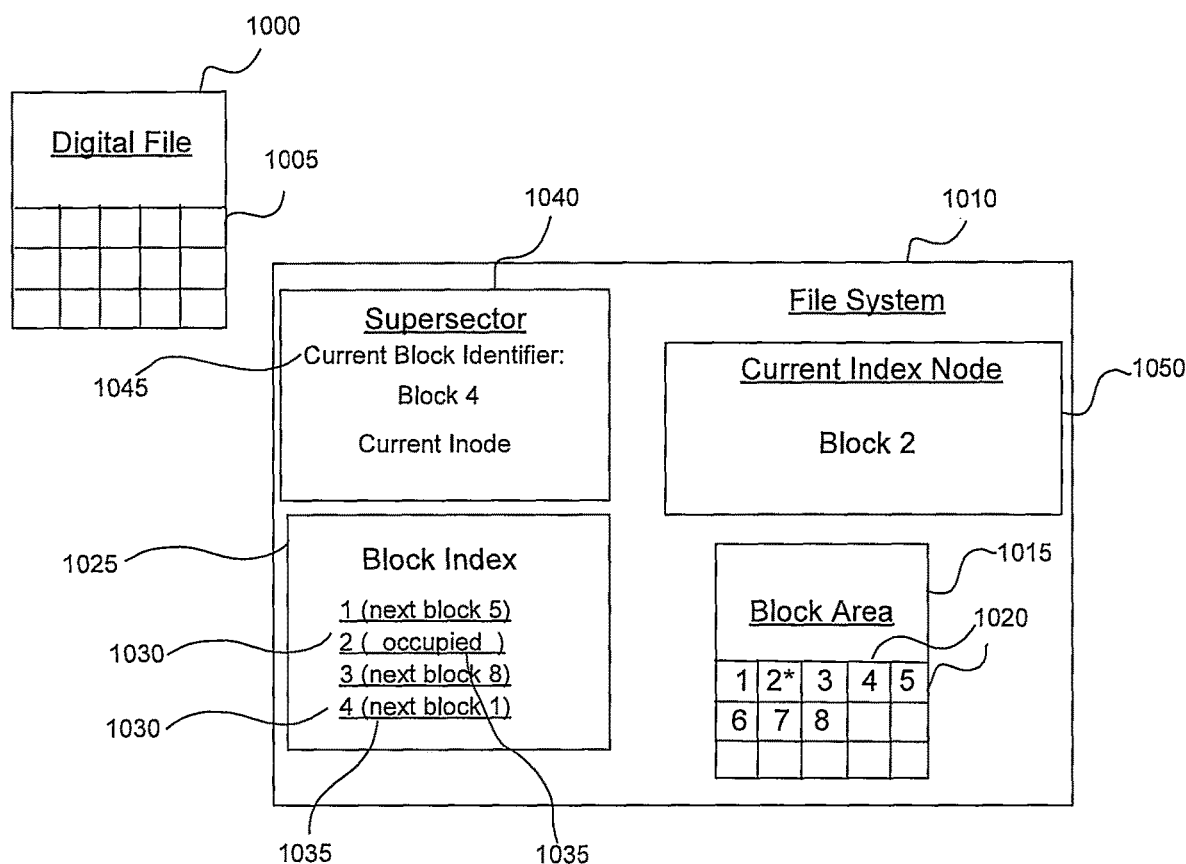
FIG. 11 illustrates another exemplary schematic for file storage of a memory architecture system, in accordance with embodiments of the invention.

An example of updating the file structure according to examples described herein is discussed in FIGS. 10 and 11. FIG. 10 provides a schematic of a file system prior to the storage of file component, in accordance with embodiments of the invention. In particular, FIG. 10 illustrates a file 1000 having file components 1005 that may be stored in a file system 1010. File components 1005 may be stored in storage blocks 1020 of block storage area 1015. Each storage block 1020 in block storage area 1015 that corresponds to a block identifier 1030 that is listed in block index 1025. Each block identifier 1030 corresponds to a storage block 1020 in block storage area 1015. This association is seen in FIG. 10 as block ID identifier units 1030 referenced as "1", "2", "3", and "4" correspond to storage blocks 1020 referenced as "1", "2", "3", and "4" within block storage area 1015, respectively.

File component 1005 may be stored in block storage area 1015 according to a file structure that links the storage blocks 1020 through the block index 1025. In particular, the storage blocks 1020 are referenced by a block ID identifier unit 1030 listed in the block index 1025, and further, each block ID identifier unit 1030 has content 1035 that references a linked block that may be used to store a subsequent file component. Additionally, the file structure 1010 identifies a storage block 1020 within block storage area 1015 that may be used to store a file component by referencing a currently operable block identifier 1045 at supersector 1040. As seen in FIG. 10, the currently operable block identifier 1045 is referenced as "Block 2." As such, the file component 1005 is stored at a storage block 1020 that is referenced as "2" within block storage area 1015. Further, after the file component 1005 is stored at block 2 of block storage area 1020, the block ID identifier unit 1030 that corresponds to block 2 is stored at a current index node 1050 that is associated with the file 1000 that is being stored.

Once the file component 1005 has been stored at block 2, a next file component 1005 will be stored at a subsequent storage block of block storage area 1020. A block ID identifier unit 1030 of a subsequent storage block, referenced as "next block 4", is identifiable as content 1035 of the block ID identifier unit 1030 referenced as "2" as seen in FIG. 10. This subsequent block identifier is then used to update currently operable block identifier 1045. In particular, FIG. 11 provides a schematic of an updated file system 1000 after a file component has been stored at a storage block 1020 referenced as "block 2" of block storage area 1015.

As seen in FIG. 11, currently operable block identifier 1045 has been updated and is referenced as "Block 4." Current index node 1050 has also been updated to include a reference to "Block 2" as a file component 1005 of file 1000 is stored in a storage block 1020 referenced as "block 2" of storage block area 1015. Additionally, block 2 of block storage area 1020 has been updated to be marked with an asterisk * so as to indicate that block 2 is now updated. Further, content 1035 of the block ID identifier unit 1030 that corresponds to "2" is updated to reference "occupied," as block 2 of storage block area 1020 is now occupied. Accordingly, the next file component 1005 of file 1000 will be stored at a storage block 1020 referenced as "block 4" of storage block area 1015 as identified by currently operable block identifier 1045.

Once a file has been stored, it may at some future point be deleted from the file structure. In particular, a file may be deleted when a user prioritizes the acquisition of additional data over the retention of data that has previously been acquired and stored. In examples, the file may be deleted from the storage block areas. In other examples, portions of the file may be disconnected from a file retrieval reference and subsequent data may overwrite the portions of the file. Once this occurs, systems and methods of the invention are provided for increasing available storage in the image storage system.

In particular, an example of a method of increasing available storage in an image storage system is provided. The method comprises identifying a current block identifier as a second block identifier that references a second idle storage block. The method also comprises determining that an occupied storage block that corresponds to a first block identifier has become idle. Additionally, the method comprises updating the current block identifier from the second block identifier to the first block identifier. The method also comprises listing the first block identifier in a block index and associating the first block identifier with a first content that stores the second block identifier. A location of the second idle storage block is independent of a location of the first idle storage block.

In additional examples, the method may comprise determining that a second idle storage block that corresponds to a third block identifier has become idle. The method may also comprise updating the currently operable block identifier from the first block identifier to the third block identifier. Additionally, a determination that the occupied storage block has become idle may comprise receiving an indication that a reference to the occupied storage block from a storage file has been deleted. Further, a determination that the occupied storage block has become idle may comprise receiving an indication that content stored within the storage block has been deleted.

Figure 12:
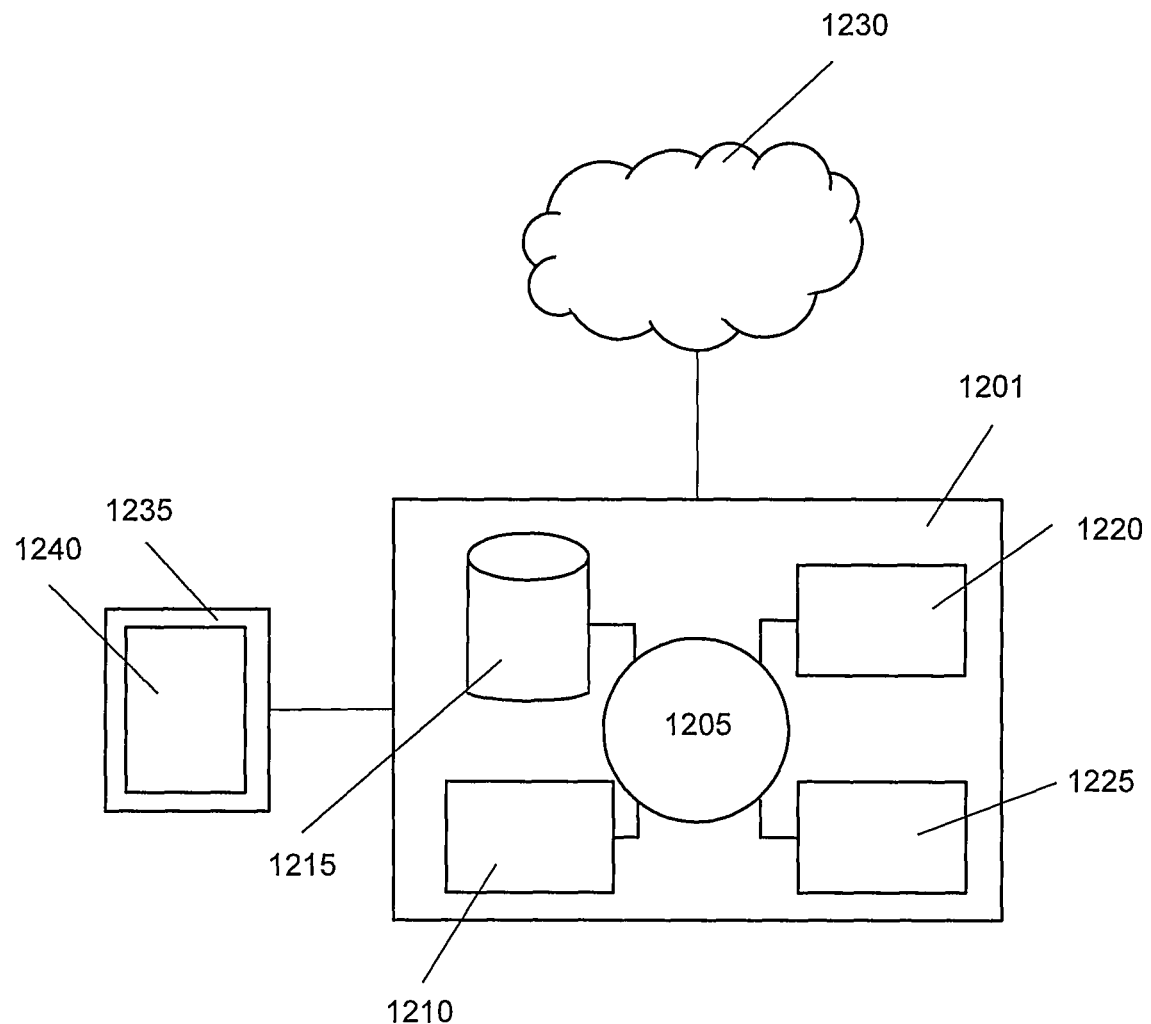
FIG. 12 illustrates a computer control system that is programmed or otherwise configured to implement methods provided herein, in accordance with embodiments of the invention.

The present disclosure provides computer control systems that are programmed to implement methods of the disclosure. FIG. 12 shows a computer system 1201 that is programmed or otherwise configured to process video data. The computer system 1201 can regulate various aspects of writing and reading image data of the present disclosure, such as, for example, capturing image data, writing storage data, and reading storage data. The computer system 1201 can be a processor of an image capture system, an electronic device of a user, or a computer system that is remotely located with respect to the electronic device. The electronic device can be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user (e.g., a user terminal). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, a user terminal that plays video and/or allows a user to edit video at the user interface 1240. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, create efficient block storage areas by forming link relations between block identifiers that correspond to storage blocks within the block storage areas.

In some embodiments, the image capture device that is used in embodiments discussed herein may be a camera. Additionally, the camera may be used with, attached to, or a component of a UAV. The camera may be rigidly coupled to the UAV. Alternatively, the camera may be permitted to move relative to the UAV. In some instances, the camera may be permitted to move with respect to up to six degrees of freedom relative to the UAV. The camera may be directly mounted onto the UAV, may be incorporated within the UAV, or may be coupled to a carrier mounted onto the UAV. In some embodiments, the carrier may be a gimbal. The carrier may permit the camera to rotate about one, two, three, four or more axes of rotation. This may permit the field of view captured by the camera to be altered. In some embodiments, the camera may be an element of a payload of the UAV.

The camera may capture images of an environment of the UAV. The images may include still images (e.g., snapshots) and/or video images. The camera may continuously capture video and/or snapshots. Alternatively, the camera may capture video and/or snapshots at a specified frequency to produce a series of image data and/or video data over time. In some embodiments, the video may be captured simultaneously with a recording of environment audio.

In some embodiments, the captured video and/or images may be stored in a memory onboard the UAV. The memory may be on-board the image capture device or may be separate from the image capture device. The memory may include non-transitory computer readable medium that may include one or more memory units (e.g., removable media or external storage such as a Secure Digital (SD) card, or a random access memory (RAM), or a read only memory (ROM) or a flash memory). Alternatively, the captured video and/or images may be transmitted to a remote terminal. The transmission of captured video and/or images may be implemented over a wireless link, including but not limited to, a radio frequency (RF) link, a Wi-Fi link, a blue tooth link, a 2G link, a 3G link, or a LTE link.

The camera may comprise an image sensor, and one or more optical elements, such as lenses. The one or more lenses may be configured to direct light to the image sensor. An image sensor is a device that converts an optical image into an electronic signal. The image sensor of the camera may be a charge-coupled device (CCD) type, a complementary metal-oxide-semiconductor (CMOS) type, a N-type metal-oxide-semiconductor (NMOS) type, or a back-side illuminated CMOS (BSI-CMOS) type. Optionally, image data from the image sensor may be stored in memory on-board or off-board the image capture device. The memory may be on-board a UAV.

A focal length of an optical system is a measure of how strongly the system converges or diverges light. The focal length of an optical lens is the distance over which initially collimated rays are brought to a focus. There are two types of lenses: prime and zoom. A prime lens may have a fixed focal length and the focal length may encompass a single focal length. A zoom lens may have variable focal lengths and the focal length may encompass a plurality of focal lengths. In some embodiments, the lens of the camera may be a zoom lens. Alternatively, the lens of the camera may be a prime lens.

In some embodiments, a lower limit of the focal length range for a zoom lens suitable for the image capture device of the invention may be less than or equal to 1 mm, 2 mm, 4 mm, 6 mm, 8 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, or 1150 mm. Optionally, the lower limit of the focal length range for the image capture device of the invention may be less than or equal to any of the values described herein. The lower limit of the focal length range for a zoom lens suitable for the image capture device of the invention may have a value falling within a range between any two of the values described herein.

In some instances, an upper limit of the focal length range for a zoom lens suitable for the image capture device of the invention may be less than or equal to 2 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 2000 mm. Optionally, the upper limit of the focal length range for a zoom lens suitable for the image capture device of the invention may be less than or equal to any of the values described herein. The upper limit of the focal length range for a zoom lens suitable for the image capture device of the invention may have a value falling within a range between any two of the values described herein.

In some instances, a focal length of a prime lens suitable for the image capture device of the invention may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 1200 mm. Optionally, the focal length of a prime lens suitable for the image capture device of the invention may be less than or equal to any of the values described herein. The focal length of a prime lens suitable for the image capture device of the invention may have a value falling within a range between any two of the values described herein.

In photography, the field of view (FOV) is that part of the world that is visible through the camera at a particular position and orientation in space; objects outside the FOV when the picture is taken are not recorded in the photograph. It is most often expressed as the angular size of the view cone, as an angle of view. For normal lens, field of view can be calculated as FOV=2 arctan(d/2f), where d is image sensor size, and f is focal length of the lens. For an image sensor having a fixed size, the prime lens may have a fixed FOV and the FOV may encompass a single FOV angle. For an image sensor having a fixed size, the zoom lens may have variable FOV angular range and the FOV angular range may encompass a plurality of FOV angles.

In some instances, a FOV of a prime lens suitable for the image capture device of the invention may be less than or equal to 170°, 169°, 165°, 155°, 145°, 140°, 135°, 130°, 125°, 120°, 115°, 110°, 105°, 100°, 95°, 90°, 85°, 80°, 75°, 70°, 65°, 60°, 55°, 50°45°, 400, 35°, 30°, 25°, 20°, 15°, 10°, 5°, 3°, 2°, or 1°. Optionally, the FOV of a prime lens suitable for the image capture device of the invention may be less than or equal to any of the values described herein. The FOV of a prime lens suitable for the image capture device of the invention may have a value falling within a range between any two of the values described herein.

In some instances, a lower limit of the FOV angular range for a zoom lens suitable for the image capture device of the invention may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 3°, 2°, or 1°. Optionally, the lower limit of the FOV angular range for a zoom lens suitable for the image capture device of the invention may be less than or equal to any of the values described herein. The lower limit of the FOV angular range for a zoom lens suitable for the image capture device of the invention may have a value falling within a range between any two of the values described herein.

In some instances, an upper limit of the FOV angular range for a zoom lens suitable for the image capture device of the invention may be less than or equal to 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the upper limit of the FOV angular range for a zoom lens suitable for the image capture device of the invention may be less than or equal to any of the values described herein. The upper limit of the FOV angular range for a zoom lens suitable for the image capture device of the invention may have a value falling within a range between any two of the values described herein.

An image capture device may be a high-resolution image capture device. In some embodiments, the image capture device may be a 4 K image capture device capable of achieving 4K resolution. The image capture device may be capable of achieving a horizontal resolution of greater than or equal to about 1000 pixels, 2000 pixels, 2500 pixels, 3000 pixels, 3500 pixels, 4000 pixels, 4500 pixels, 5000 pixels, 5500 pixels, 6000 pixels, 7000 pixels, 8000 pixels, or 10000 pixels. In some instances, the image capture device may achieve a horizontal resolution of less than or equal to about 4000 pixels, 6000 pixels, 8000 pixels, 10000 pixels, 12000 pixels, 15000 pixels, 20000 pixels, or 30000 pixels. The horizontal resolution of any of the images captured may fall between any of the values described herein. A high resolution camera may be capable of storing, in a memory, images at the resolution at which they were captured. Alternatively, images may be stored at a lower resolution than at which they were captured. The images may be stored in high resolution, such as any of the resolutions described herein.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$3, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 13:
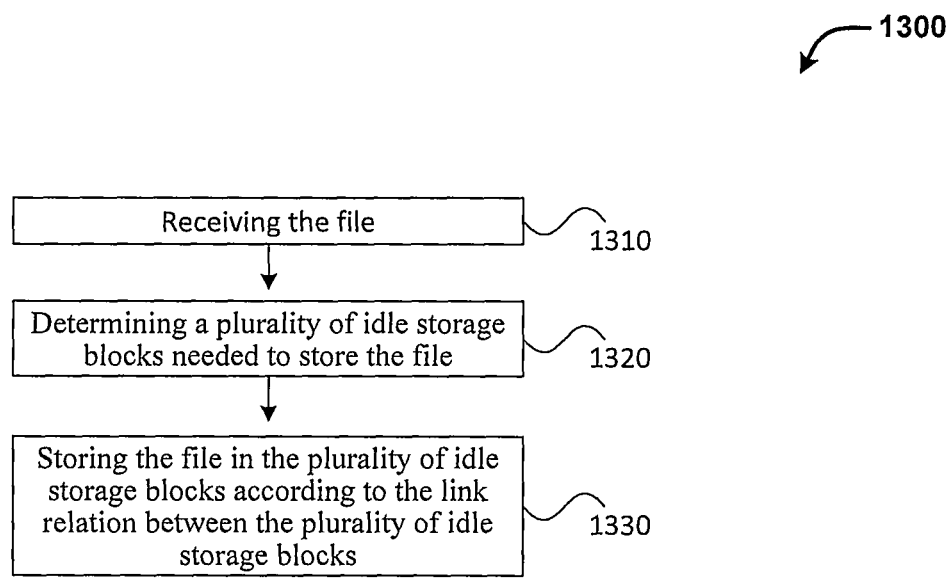
FIG. 13 illustrates a flowchart of a method of storing a file, in accordance with embodiments of the invention.

FIG. 13 illustrates a flowchart 1300 of a method of storing a file, in accordance with embodiments of the invention. At block 1310, a file is received. At block 1320, a plurality of idle storage blocks needed to store the file are determined. At block 1330, the file is stored in a plurality of idle storage blocks. In particular, the file is stored in the plurality of idle storage blocks according to the link relation between the plurality of idle storage blocks. The method may further comprise storing a description of the file in an index node. Each index node identifier may be listed in a successive table. The currently available index node identifier may be determined by adding a fixed increment to a most recently occupied index node identifier. The fixed increment may be 1.

The method may further comprise updating the currently available index node identifier after completing storage of the file. The method may further comprise updating a number of held blocks as stored within the currently available index node. A currently operable block identifier may be stored in a key information area is updated when a block is stored. The key information area may be in an information sector. The method may further comprise initializing a file system before receiving the file. Initializing the file system may comprise determining and recording a currently available index node identifier. Additionally or alternatively, initializing the file system may comprise determining and recording a currently operable block identifier.

Figure 14:
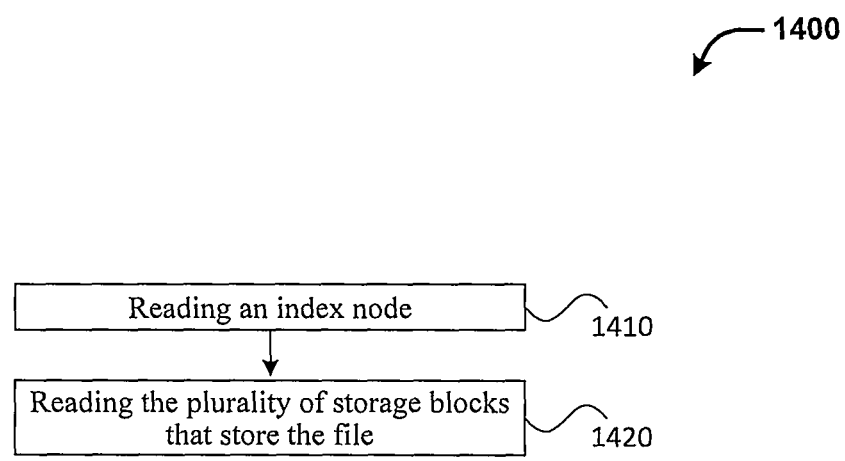
FIG. 14 illustrates a flowchart of a method of reading a file, in accordance with embodiments of the invention.

FIG. 14 illustrates a flowchart 1400 of a method of reading a file, in accordance with embodiments of the invention. At block 1410, an index node is read. At block 1420, the plurality of storage blocks that store the file are read. The method of reading a file may further comprise receiving a reading command prior to reading the index node. The method may comprise receiving a reading command prior to reading the index node. The reading command may be analyzed prior to reading the index node. Analyzing the reading command may comprise determining a content to be read.

The method may further comprise reading a directory item prior to reading the index node from a directory table. The directory item may be associated with the content of the index node to be read. A starting index node identifier may be determined from the directory item. An ending index node identifier may be determined from the directory item. Additionally, reading an index node may be executed after identifying an ending index node identifier. The reading the index node may be executed after analyzing a reading command, indexing to a corresponding directory, and indexing to a corresponding index node. Additionally, a location of the second idle storage block may be independent of a location of the first idle storage block. A number of storage blocks needed to store the file may be calculated based on an amount of data within the file. Additionally, the amount of data within the file may be determined based on a resolution of the file.

Figure 15:
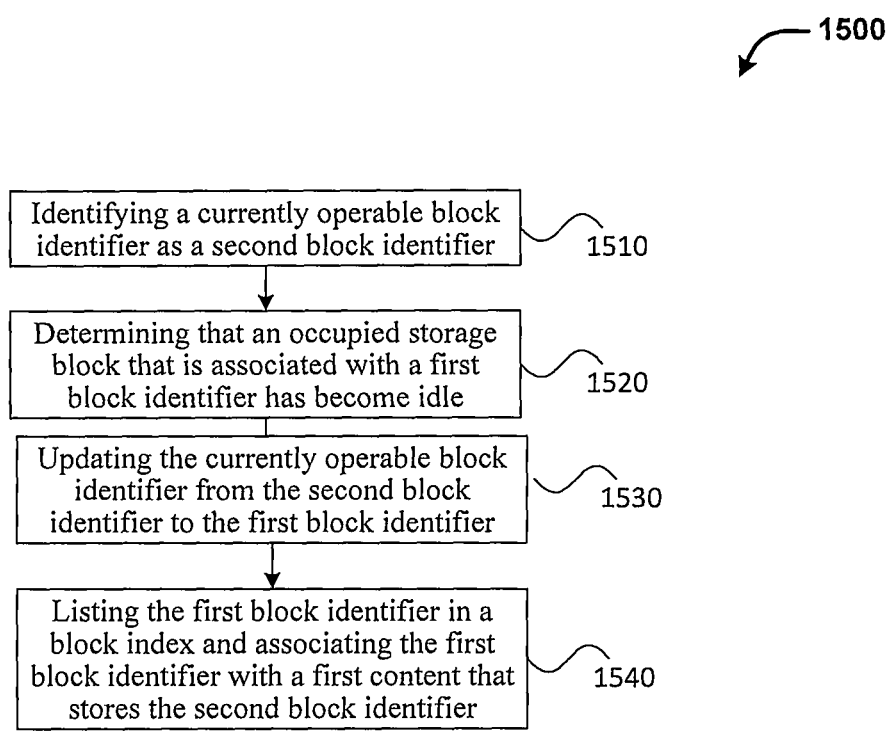
FIG. 15 illustrates a flowchart of increasing available storage in an image storage system, in accordance with embodiments of the invention.

FIG. 15 illustrates a flowchart 1500 of a method of increasing available storage in an image storage system, in accordance with embodiments of the invention. At block 1510, a currently operable block identifier is identified as a second block identifier. The second block identifier references a second idle storage block. At block 1520, an occupied storage block that is associated with a first block identifier has become idle is determined. At block 1530, the currently operable block identifier is updated from the second block identifier to the first block identifier. At block 1540, the first block identifier is listed in a block index. The first block identifier is associated with a first content that stores the second block identifier.

The method may further comprise determining that a second idle storage block that is associated with a third block identifier has become idle and updating the currently operable block identifier from the first block identifier to the third block identifier. Determining that the occupied storage block has become idle may comprise receiving an indication that a reference to the occupied storage block from a storage file has been deleted. Additionally, determining that the occupied storage block has become idle may comprise receiving an indication that content stored within the storage block has been deleted.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of storing a file in a file system that includes one or more processors and a media capture device, said method comprising:
   receiving, by the media capture device, the file;
   providing, by the one or more processors, a first connector pointing to an idle index node identifier, the idle index node identifier identifying an idle index node within a table;
   providing, by the one or more processors, a second connector pointing to a first block ID identifier unit, the first block ID identifier unit corresponding to a first idle storage block and storing a block identifier of a second idle storage block;
   determining, by the one or more processors, a plurality of idle storage blocks needed to store the file, wherein:
      the first idle storage block and the second idle storage block are included in the plurality of idle storage blocks, and
      each idle storage block of the plurality of idle storage blocks corresponds to a corresponding block ID identifier unit, and the corresponding block ID identifier unit stores a block identifier of a next idle storage block to form a link relation between the plurality of idle storage blocks;
   storing, by the one or more processors, a plurality of portions of the file in the plurality of idle storage blocks with each idle storage block storing one of the plurality of portions of the file according to the link relation between the plurality of idle storage blocks, replacing, by the one or more processors, the block identifier of the next idle storage block stored in a block ID identifier unit with a flag indicator after the portion of the file has been stored in the corresponding idle storage block, and updating, by the one or more processors, the second connector to point to a next block ID identifier unit according to the link relation between the plurality of idle storage blocks;
   storing, in the idle index node, a plurality of block identifiers that identify the plurality of idle storage blocks configured to store the file;
   in response to completing storage of the file, updating the first connector to point to a next idle index node identifier within the table; and
   overwriting a portion of the file stored in a currently occupied storage block, including:
      identifying a block identifier referencing the currently occupied storage block as a first block identifier;
      identifying a current block identifier as a second block identifier that references a third idle storage block;
      updating the current block identifier from the second block identifier to the first block identifier; and
      associating the first block identifier with a first content that stores the second block identifier.

2. The method of claim 1, further comprising:
   storing, by the one or more processors, a description of the file in the idle index node.

3. The method of claim 2, wherein the description of the file is stored in the idle index node when the corresponding idle index node identifier is determined to be a currently available index node identifier, after receiving the file.

4. The method of claim 3, further comprising: identifying, by the one or more processors, the currently available index node identifier by adding a fixed increment to a most recently occupied index node identifier when the idle index node identifier is listed in a successive table.

5. The method of claim 3, further comprising:
updating, by the one or more processors, a number of held blocks as stored within the idle index node associated with the currently available index node identifier, wherein the number of held blocks comprises reference to the plurality of idle storage blocks used to store the file.

6. The method of claim 1, wherein determining the plurality of idle storage blocks needed to store the file comprises: calculating, by the one or more processors, a number of the idle storage blocks based on an amount of data within the file.

7. The method of claim 1, wherein the operable block identifier includes a currently operable block identifier, and the currently operable block identifier that is stored in a key information area is updated when a block is stored.

8. The method of claim 7, wherein the key information area stores disk information that exceeds a threshold level of importance.

9. The method of claim 1, wherein the operable block identifier includes a currently operable block identifier, and the currently operable block identifier is determined based on a last occupied block identifier and a block identifier which is linked by the occupied block identifier in the block index.

10. The method of claim 1, further comprising: initializing, by the one or more processors, the file system before receiving the file, wherein initializing the file system comprises: determining and recording, by the one or more processors, a currently available index node identifier, wherein the currently available index node identifier identifies the idle index node within the table.

11. The method of claim 1, further comprising: initializing, by the one or more processors, the file system before receiving the file, wherein initializing the file system comprises: determining and recording, by the one or more processors, the operable block identifier.

12. The method of claim 1, wherein the file is captured using the media capture device that is installed on an unmanned aerial vehicle (UAV).

13. The method of claim 12, wherein the storing of the file occurs while the UAV is in flight.

14. The method of claim 1, wherein storing a portion of the file in each idle storage block of the plurality of idle storage blocks according to the link relation between the plurality of idle storage blocks and updating the second connector to point to the next block ID identifier unit according to the link relation between the plurality of idle storage blocks, includes:
storing, by the one or more processors, a first portion of the file in the idle storage block identified by the operable block identifier;
updating, by the one or more processors, the second connector to point to the next block ID identifier unit, the next block ID identifier unit being determined based on the operable block identifier and a block identifier which is linked by the operable block identifier; and
storing, by the one or more processors, a second portion of the file in a block corresponding to the next block ID identifier unit.

15. A non-transitory computer readable medium containing program instructions for storing a file in a file system that includes one or more processors and a media capture device, said computer readable medium comprising:

program instructions for configuring the media capture device to receive the file;
program instructions for configuring the one or more processors to:
provide a first connector pointing to an idle index node identifier, the idle index node identifier identifying an idle index node within a table;
provide a second connector pointing to a first block ID identifier unit, the first block ID identifier unit corresponding to a first idle storage block and storing a block identifier of a second idle storage block;
determine a plurality of idle storage blocks needed to store the file, wherein:
the first idle storage block and the second idle storage block are included in the plurality of idle storage blocks, and
each idle storage block of the plurality of idle storage blocks corresponds to a corresponding block ID identifier unit, and the corresponding block ID identifier unit stores a block identifier of a next idle storage block to form a link relation between the plurality of idle storage blocks;
store a plurality of portions of the file in the plurality of idle storage blocks with each idle storage block storing one of the plurality of portions of the file according to the link relation between the plurality of idle storage blocks, replace the block identifier of the next idle storage block stored in the block ID identifier unit with a flag indicator after the portion of the file has been stored in the corresponding idle storage block, and update the second connector to point to a next block ID identifier unit according to the link relation between the plurality of idle storage blocks;
store, in the idle index node, a plurality of block identifiers that identify the plurality of idle storage blocks configured to store the file;
in response to completing storage of the file, update the first connector to point to a next idle index node identifier within the table; and
overwrite a portion of the file stored in a currently occupied storage block, including:
identifying a block identifier referencing the currently occupied storage block as a first block identifier;
identifying a current block identifier as a second block identifier that references a third idle storage block;
updating the current block identifier from the second block identifier to the first block identifier; and
associating the first block identifier with a first content that stores the second block identifier.

16. A system for storing a file, said system comprising:
a media capture device configured to capture a file; and
one or more processors, individually or collectively configured to:
provide a first connector pointing to an idle index node identifier, the idle index node identifier identifying an idle index node within a table;
provide a second connector pointing to a first block ID identifier unit, the first block ID identifier unit corresponding to a first idle storage block and storing a block identifier of a second idle storage block;
determine a plurality of idle storage blocks needed to store the file,
wherein:
the first idle storage block and the second idle storage block are included in the plurality of idle storage blocks, and each idle storage block of the plurality of idle storage blocks corresponds to a corresponding block ID identifier unit, and the corresponding block ID identifier unit stores a block identifier of a next idle storage block to form a link relation between the plurality of idle storage blocks;

store a plurality of portions of the file in the plurality of idle storage blocks with each idle storage block storing one of the plurality of portions of the file according to the link relation between the plurality of idle storage blocks, replace the block identifier of the next idle storage block stored in a block ID identifier unit with a flag indicator after the portion of the file has been stored in the corresponding idle storage block, and update the second connector to point to a next block ID identifier unit according to the link relation between the plurality of idle storage blocks;

store, in the idle index node, a plurality of block identifiers that identify the plurality of idle storage blocks configured to store the file;

in response to completing storage of the file, update the first connector to point to a next idle index node identifier within the table; and overwrite a portion of the file stored in a currently occupied storage block, including:

identifying a block identifier referencing the currently occupied storage block as a first block identifier;

identifying a current block identifier as a second block identifier that references a third idle storage block;

updating the current block identifier from the second block identifier to the first block identifier; and associating the first block identifier with a first content that stores the second block identifier.

17. The system of claim 16, wherein the one or more processors are further configured to:

store a description of the file in the idle index node.

* * * * *